United States Patent
Yamine et al.

(10) Patent No.: US 12,149,984 B2
(45) Date of Patent: Nov. 19, 2024

(54) REPORTING OF NETWORK PERFORMANCE DEGRADATION IN A COMMUNICATIONS SYSTEM

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 17/610,749

(22) PCT Filed: May 15, 2019

(86) PCT No.: PCT/EP2019/062464
§ 371 (c)(1),
(2) Date: Nov. 12, 2021

(87) PCT Pub. No.: WO2020/228948
PCT Pub. Date: Nov. 19, 2020

(65) Prior Publication Data
US 2022/0248261 A1 Aug. 4, 2022

(51) Int. Cl.
*H04W 28/02* (2009.01)
*H04L 69/28* (2022.01)
(Continued)

(52) U.S. Cl.
CPC ......... *H04W 28/0284* (2013.01); *H04L 69/28* (2013.01); *H04W 24/08* (2013.01); *H04W 24/10* (2013.01)

(58) Field of Classification Search
CPC . H04W 28/0284; H04W 24/08; H04W 24/10; H04L 69/28
See application file for complete search history.

(56) References Cited

U.S. PATENT DOCUMENTS

| 9,220,028 B2 * | 12/2015 | Suzuki | H04W 24/10 |
| 2012/0108199 A1 * | 5/2012 | Wang | H04W 24/10 |
| | | | 709/224 |

(Continued)

FOREIGN PATENT DOCUMENTS

| EP | 2360961 A2 | 8/2011 |
| EP | 2533562 A1 | 12/2012 |

(Continued)

OTHER PUBLICATIONS

International Search Report and Written Opinion dated Jul. 8, 2019 for International Application No. PCT/EP2019/062464 filed May 15, 2019, consisting of 12-pages.

(Continued)

*Primary Examiner* — Deepa Belur
(74) *Attorney, Agent, or Firm* — Weisberg I.P. Law, P.A.

(57) ABSTRACT

There are provided mechanisms for reporting network performance degradation in a communications system. A method is performed by a wireless device. The method includes selecting a first configuration for reporting the network performance degradation when current speed of travel is above a speed threshold, and else selecting a second configuration. According to the second configuration the reporting is controlled by a network-specific timer. A new reporting of the network performance degradation for one and the same location is only allowed upon expiration of the network-specific timer. The method includes reporting, to a network node in the communications system, network performance degradation as currently experienced by the wireless device using the selected configuration.

18 Claims, 5 Drawing Sheets

(51) Int. Cl.
*H04W 24/08* (2009.01)
*H04W 24/10* (2009.01)

(56) References Cited

U.S. PATENT DOCUMENTS

| | | | | |
|---|---|---|---|---|
| 2012/0142349 A1* | 6/2012 | Guo | ............. | H04W 68/12 |
| | | | | 455/435.1 |
| 2018/0139622 A1* | 5/2018 | Cornforth | ............. | H04W 24/00 |
| 2019/0110191 A1* | 4/2019 | Lee | ............. | H04W 4/44 |
| 2019/0258558 A1* | 8/2019 | Beuch | ............. | G06F 11/0757 |
| 2020/0158528 A1* | 5/2020 | Feng | ............. | G01C 21/3635 |
| 2020/0260311 A1* | 8/2020 | Jung | ............. | H04W 24/10 |

FOREIGN PATENT DOCUMENTS

| | | | |
|---|---|---|---|
| EP | 2360961 A3 | 11/2022 | |
| WO | 2017173037 A1 | 10/2017 | |
| WO | WO-2018058513 A1 * | 4/2018 | ............ H04B 7/0695 |
| WO | 2018132044 A1 | 7/2018 | |
| WO | 2019242861 A1 | 12/2019 | |
| WO | 2020167206 A1 | 8/2020 | |
| WO | 2020228948 A1 | 11/2020 | |

OTHER PUBLICATIONS

3GPP TS 23.271 V15.1.0; 3rd Generation Partnership Project; Technical Specification Group Services and System Aspects; Functional stage 2 description of Location Services (LCS) (Release 15); Sep. 2018, consisting of 184-pages.

3GPP TS 37.320 V15.0.0; 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15); Jun. 2018, consisting of 27-pages.

3GPP TS 36.331 V15.4.0; 3rd Generation Partnership Project; Technical Specification Group Radio Access Network; Evolved Universal Terrestrial Radio Access (E-UTRA); Radio Resource Control (RRC); Protocol specification (Release 15); Dec. 2018, consisting of 933-pages.

* cited by examiner

REPORTING OF NETWORK PERFORMANCE DEGRADATION IN A COMMUNICATIONS SYSTEM

CROSS-REFERENCE TO RELATED APPLICATIONS

This application is a Submission Under 35 U.S.C. § 371 for U.S. National Stage Patent Application of International Application Number: PCT/EP2019/062464, filed May 15, 2019 entitled "REPORTING OF NETWORK PERFORMANCE DEGRADATION IN A COMMUNICATIONS SYSTEM," the entirety of which is incorporated herein by reference.

TECHNICAL FIELD

Embodiments presented herein relate to a method, a wireless device, a computer program, and a computer program product for reporting network performance degradation in a communications system. Embodiments presented herein further relate to a method, a network node, a computer program, and a computer program product for handling reporting of network performance degradation from a wireless device in a communications system.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability for the network to be made aware of network performance degradations. This could enable the network to itself detect problems and automatically solve them without human intervention.

Further, it could be advantageous to detect any performance degradation as soon as possible, so that network auto-healing algorithms either solve such issue as soon as possible or try to prevent latency-sensitive applications or devices from passing through the served area suffering from performance degradation.

Some current telecommunications standards therefore allow wireless devices served in the communications system to in real time report events of performance degradation occurring in the communications system, but then only when the wireless devices are in connected mode. Thus, when in idle mode the wireless devices do not report events of performance degradation in real time. Wireless devices in idle mode might instead log any encountered events pertaining to performance degradation and then report the event later during its next connection to the network, i.e., when in connected mode. In some examples such logs can be stored up to 48 hours.

According to 3GPP Technical Specification 37.320 "Radio measurement collection for Minimization of Drive Tests (MDT); Overall description", v15.0.0, when a wireless device (user equipment; UE) encounters a degradation, either the terminal device will report the degradation in real time, e.g. in case the wireless device is in connected mode, or the wireless device will store information about the degradation in its memory and then report it later at a next call action, e.g. at a next location update or at a next call.

However, there is still a need for improved reporting, of performance degradation in communications systems.

SUMMARY

An object of embodiments herein is to provide efficient reporting, and handling of such reporting, of performance degradation in communications systems.

According to a first aspect there is presented a method for reporting network performance degradation in a communications system. The method is performed by a wireless device. The method comprises selecting a first configuration for reporting the network performance degradation when current speed of travel is above a speed threshold, and else selecting a second configuration. According to the second configuration the reporting is controlled by a network-specific timer. A new reporting of the network performance degradation for one and the same location is only allowed upon expiration of the network-specific timer. The method comprises reporting, to a network node in the communications system, network performance degradation as currently experienced by the wireless device using the selected configuration.

According to a second aspect there is presented a wireless device for reporting network performance degradation in a communications system. The wireless device comprises processing circuitry. The processing circuitry is configured to cause the wireless device to select a first configuration for reporting the network performance degradation when current speed of travel is above a speed threshold, and else selecting a second configuration. According to the second configuration the reporting is controlled by a network-specific timer. A new reporting of the network performance degradation for one and the same location is only allowed upon expiration of the network-specific timer. The processing circuitry is configured to cause the wireless device to report, to a network node in the communications system, network performance degradation as currently experienced by the wireless device using the selected configuration.

According to a third aspect there is presented a wireless device for reporting network performance degradation in a communications system. The wireless device comprises a select module configured to select a first configuration for reporting the network performance degradation when current speed of travel is above a speed threshold, and else selecting a second configuration. According to the second configuration the reporting is controlled by a network-specific timer. A new reporting of the network performance degradation for one and the same location is only allowed upon expiration of the network-specific timer. The wireless device comprises a report module configured to report, to a network node in the communications system, network performance degradation as currently experienced by the wireless device using the selected configuration.

According to a fourth aspect there is presented a computer program for reporting network performance degradation in a communications system. The computer program comprises computer program code which, when run on processing circuitry of a wireless device, causes the wireless device to perform a method according to the first aspect.

According to a fifth aspect there is presented a method for handling reporting of network performance degradation from a wireless device in a communications system. The method is performed by a network node in the communications system. The method comprises configuring the wireless device to report the network performance degradation according to a first configuration when current speed of travel of the wireless device is above a speed threshold, and else to report the network performance degradation according to a second configuration. According to the second configuration the reporting is controlled by a network-specific timer. A new reporting of the network performance degradation for one and the same location is only allowed upon expiration of the network-specific timer. The method comprises receiving reporting of the network performance degradation as currently experienced by the wireless device according to one of the configurations as selected by the wireless device.

According to a sixth aspect there is presented a network node for handling reporting of network performance degradation from a wireless device in a communications system. The network node comprises processing circuitry. The processing circuitry is configured to cause the network node to configure the wireless device to report the network performance degradation according to a first configuration when current speed of travel of the wireless device is above a speed threshold, and else to report the network performance degradation according to a second configuration. According to the second configuration the reporting is controlled by a network-specific timer. A new reporting of the network performance degradation for one and the same location is only allowed upon expiration of the network-specific timer. The processing circuitry is configured to cause the network node to receive reporting of the network performance degradation as currently experienced by the wireless device according to one of the configurations as selected by the wireless device.

According to a seventh aspect there is presented a network node for handling reporting of network performance degradation from a wireless device in a communications system. The network node comprises a configure module configured to configure the wireless device to report the network performance degradation according to a first configuration when current speed of travel of the wireless device is above a speed threshold, and else to report the network performance degradation according to a second configuration. According to the second configuration the reporting is controlled by a network-specific timer. A new reporting of the network performance degradation for one and the same location is only allowed upon expiration of the network-specific timer. The network node comprises a receive module configured to receive reporting of the network performance degradation as currently experienced by the wireless device according to one of the configurations as selected by the wireless device.

According to an eight aspect there is presented a computer program for handling reporting of network performance degradation from a wireless device in a communications system. The computer program comprises computer program code which, when run on processing circuitry of a network node, causes the network node to perform a method according to the fifth aspect.

According to a ninth aspect there is presented a computer program product comprises a computer program according to at least one of the fourth aspect and the eight aspect and a computer readable storage medium on which the computer program is stored. The computer readable storage medium could be a non-transitory computer readable storage medium.

Advantageously these methods, these wireless devices, these network nodes, these computer programs, and this computer program product provide efficient reporting, and handling of such reporting, of network performance degradation in communications systems.

Advantageously these methods, these wireless devices, these network nodes, these computer programs, and this computer program product enable the network node to receive accurate reporting of the network performance degradation whilst still minimizing the signalling required for the reporting.

Advantageously, because of the second configuration, the signalling required for the reporting can be minimized for a network performance degradation experienced within the same degradation area.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
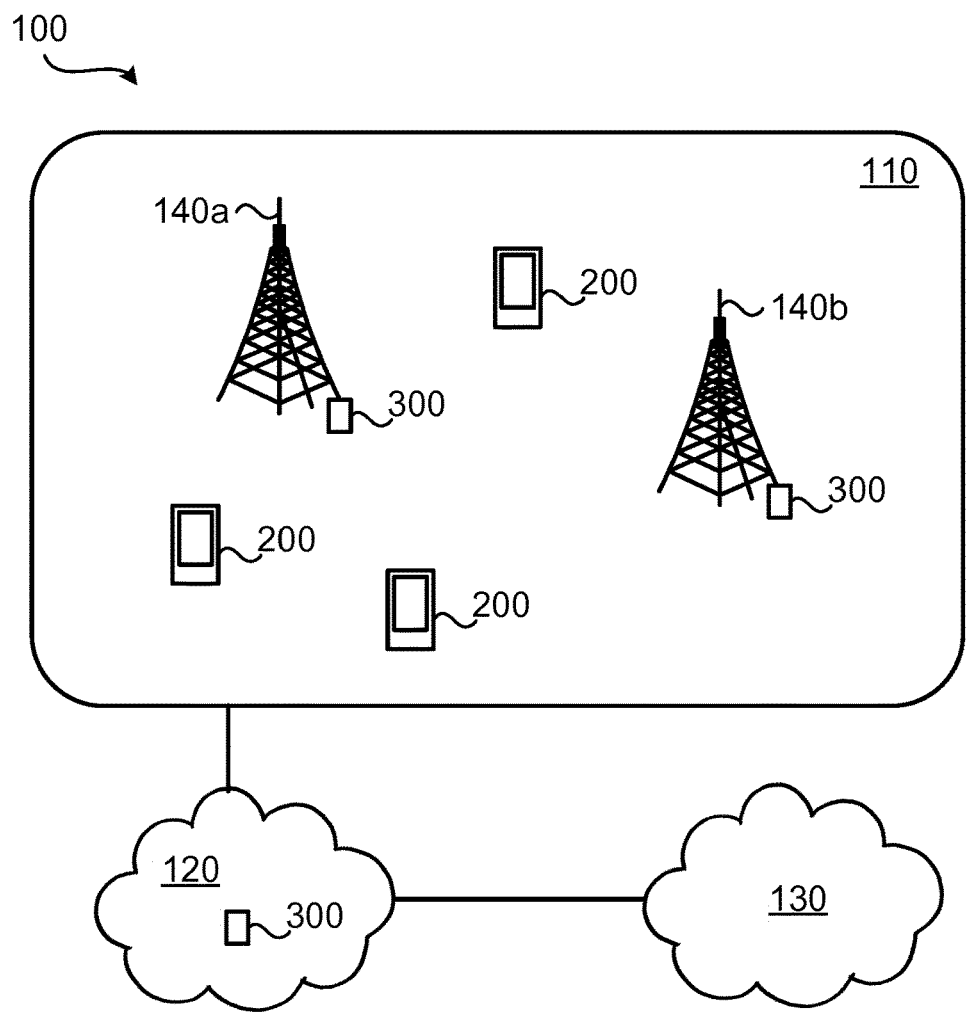
FIG. 1 is a schematic diagram illustrating a communications system according to embodiments.

FIG. 1 is a schematic diagram illustrating a communications system 100 where embodiments presented herein can be applied. The communications system 100 comprises a radio access network 110 in which at least one radio access network node 140 provide network access in cells, a core network 120, and a service network 130. The radio access network node 140 is controlled by at least one network node 300. The radio access network 110 is operatively connected to the core network 120 which in turn is operatively connected to the service network 130. The radio access network node 140 thereby enables wireless devices 200 to access services and exchange data as provided by the service network 130.

Further, as will be disclosed in more detail below, the wireless devices 200 are configured to report network performance degradation as experienced in the communications system 100 to the network node 300.

Examples of wireless devices 200 include, but are not limited to, mobile stations, mobile phones, handsets, wireless local loop phones, user equipment (UE), smartphones, laptop computers, tablet computers, sensors, actuators, modems, repeaters, network-equipped Internet of Things devices, and network-equipped vehicles. Examples of network nodes 300 include, but are not limited to, radio base stations, base transceiver stations, Node Bs, evolved Node Bs, gNBs, and access points. As the skilled person understands, the communications system 100 may comprise a plurality of radio access network nodes 140, each providing network access to a plurality of wireless devices 200, and each controlled by a network node 300. The herein disclosed embodiments are not limited to any particular number of radio access network nodes 140, network nodes 300, or wireless devices 200.

As disclosed above, there is still a need for improved reporting, of performance degradation in communications systems 100. Further details relating thereto will now be disclosed.

Some recently introduced network services that might be used by the wireless devices 200 have a very high sensitivity to delays and latency. Examples of such services are remote health monitoring, remote surgery (also known as telesurgery), driverless vehicles (also known as self-driving, or autonomous, vehicles), etc. It could therefore be beneficial for wireless devices 200 to, regardless if being in idle mode or connected mode, are enabled to report any experienced network performance degradation as efficiently as possible. This could enable the network performance degradation to be resolved as soon as possible, causing as little impact on the network services as possible.

The embodiments disclosed herein thus relate to mechanisms for reporting network performance degradation in a communications system 100 and handling reporting of network performance degradation from a wireless device 200 in a communications system 100. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2:
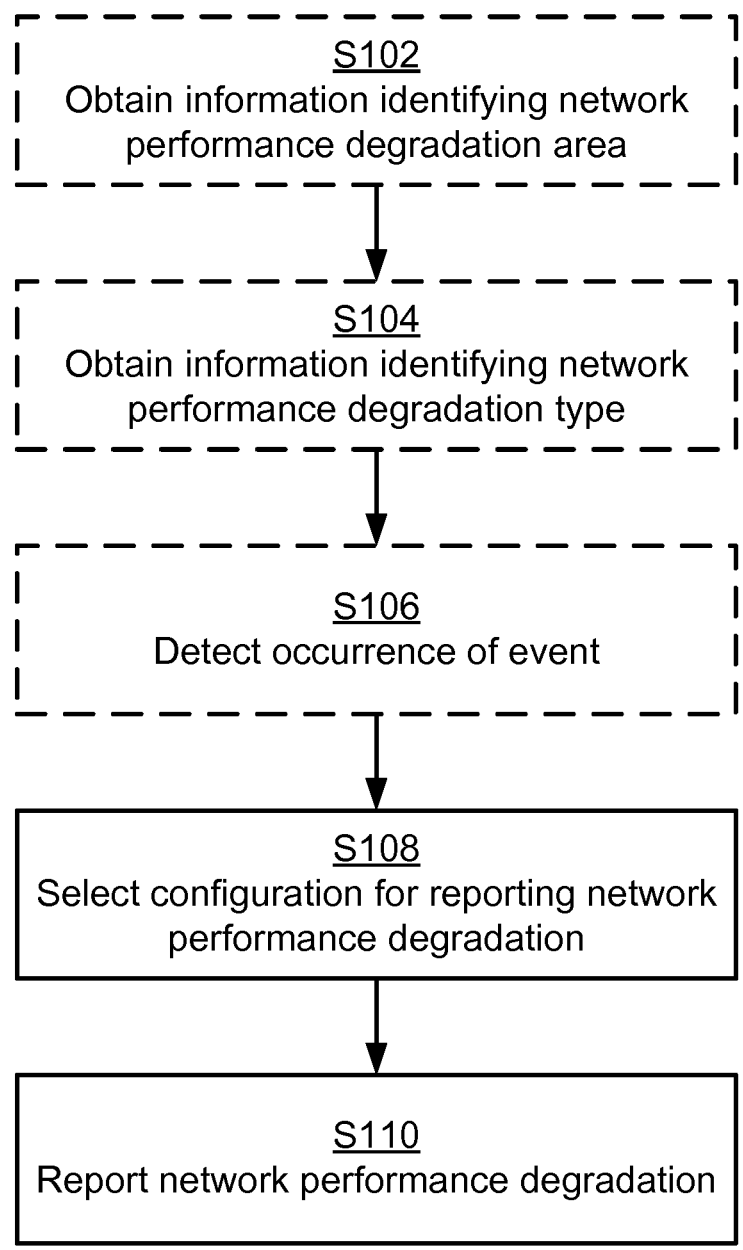
FIGS. 2, 3, and 4 are flowcharts of methods according to embodiments.

Reference is now made to FIG. 2 illustrating a method for reporting network performance degradation in a communications system 100 as performed by the wireless device 200 according to an embodiment.

The reporting of network performance degradation is by the wireless device 200 made using one of two configurations. In particular, the wireless device 200 is configured to perform step S108:

S108: The wireless device 200 selects a first configuration for reporting the network performance degradation when current speed of travel is above a speed threshold. The wireless device 200 else selects a second configuration. According to the second configuration the reporting is controlled by a network-specific timer. A new reporting of the network performance degradation for one and the same location is only allowed upon expiration of the network-specific timer.

Further details of the first configuration and the second configuration as selected in S108 will be provided below.

When network performance degradation is experienced by the wireless device 200 it is reporting according to the selected configuration. That is, the wireless device 200 is configured to perform step S110:

S110: The wireless device 200 reports, to a network node 300 in the communications system 100, network performance degradation as currently experienced by the wireless device 200 using the selected configuration.

Further details of how the network performance degradation might be reported by the wireless device 200 in S110 will be provided below.

Embodiments relating to further details of reporting network performance degradation in a communications system 100 as performed by the wireless device 200 will now be disclosed.

In some aspects not only the speed of travel but also the direction in which the wireless device 200 is travelling is considered. Then instead of speed, a measure of the current velocity could be compared to a threshold. If the current velocity is above the threshold then the first configuration is selected and else the second configuration is selected.

There could be different ways in which the wireless device 200 is configured to select either first configuration or the second configuration for reporting the network performance degradation. According to an embodiment, the wireless device 200 is configured with the first configuration and the second configuration by the network node 300.

Different aspects of the network-specific timer will now be disclosed.

In some aspects the network-specific timer acts as a network reminder timer. The wireless device 200 might be configured with the network-specific timer by its network operator. In particular, according to an embodiment, the network-specific timer has an expiration time that is configured by a network operator of the communications system 100. There could be different numerical values of the expiration time. In some examples the network-specific timer has an expiration time of 24 hours. In other examples the expiration time is 12 hours, 36 hours, or 48 hours.

There could be different ways for the wireless device 200 to be configured with the network-specific timer. According to an embodiment, the wireless device 200 is, by the network node 300, configured with the network-specific timer via broadcast transmission or radio resource control signalling.

In some aspects the terminal device 200 is configured with a device-specific timer. Aspects of the device-specific timer and how it is used by the terminal device 200 will now be disclosed. In some aspects the device-specific timer acts as a device reminder timer. The device-specific timer is used when reporting is performed according to the second configuration. In particular, according to an embodiment, according to the second configuration, the reporting of the network performance degradation is controlled by a device-specific timer. For example, a new reporting of the network performance degradation for one and the same location might only be allowed when no feedback to other reporting for one and the same location has been received and upon expiration of the device-specific timer.

There could be different ways for the wireless device 200 to be configured with the device-specific timer. According to a first example the device-specific timer has an expiration time that is reconfigurable by a network operator of the communications system 100. According to a second example the wireless device 200 is preconfigured with the device-specific timer. Thus, according to the second example, the device-specific timer might have an expiration time that is hardcoded in the wireless device 200. In general terms, the device-specific timer has an expiration time that is shorter than the expiration time of the network-specific timer. In some examples the device-specific timer has an expiration time of 10-12 hours.

In some aspects where the wireless device 200 is configured with both the network-specific timer and the device-specific timer, a new reporting of the network performance degradation for one and the same location is only allowed upon expiration of the network-specific timer, even when the device-specific timer expires first. Thus, in some examples the network reminder timer has more weight than the device reminder timer. In further detail, the network node 300 might send (via broadcast or dedicated signalling, such as via an RRC Measurement Control message during call setup for the wireless device 200) the value of the network-specific timer. When the wireless device 200 receives the value of the network-specific timer it will use this value for reminding the network node 300 when the wireless device 200 has experienced the network performance degradation. That is, a new reporting of the same network performance degradation (and an indication that the network node 300 should resolve the network performance degradation) will not be made until expiration of the network-specific timer. However, it could be that the wireless device 200 is notified by the network node 300 that the device-specific timer should take precedence. This could be the case where the network performance degradation pertains to a degradation area of particular interest (such as a geographical area where network outage should be minimized), and/or where the network performance degradation is of a particular type, or severity.

Different aspects of the first configuration will now be disclosed. As disclosed above, the wireless devices 200 selects the first configuration for reporting the network performance degradation when its current speed of travel is above the speed threshold. There could be different such speed thresholds. In some aspects, according to the first configuration the network performance degradation is reported periodically. In other aspects, according to the first configuration the network performance degradation is reported only upon detecting presence of the network performance degradation and then only upon detecting absence of the network performance degradation. The latter could reduce signalling in the communications system 100 since only two reportings are made for the same network performance degradation. The first could give the network node 300 more details information about to the network performance degradation. In this respect, information that might be provided in each reporting of the network performance degradation will be provided below.

In some aspects, any of the first configuration and the second configuration for reporting the network performance degradation could be used regardless if the wireless device 200 is in connected mode or idle mode. That is, according to an embodiment, the network performance degradation is reported as specified according to the selected configuration regardless if the wireless device 200 is in connected mode or idle mode when the network performance degradation is to be reported. As an example, when the wireless device 200 is in idle mode it might report in real time the network performance degradation only at the end of the network performance degradation.

In some aspects the wireless device 200 is informed in advance by the network node 300 of areas where network performance degradation previously has been reported, and/or of areas for which the network node 300 requests reportings. Particularly, according to an embodiment, the wireless device 200 is configured to perform (optional) step S102:

S102: The wireless device 200 obtains, from the network node 300, information identifying a network performance degradation area. The network performance degradation is then reported only when the wireless device 200 is located within the network performance degradation area.

There could be different types of information identifying the network performance degradation area. For example, the information might either be explicit (such as in the form of a map) or be implicit (such as in terms of geographical coordinates).

There could be different types of maps. For example, the map might be determined according to a set of rules (e.g., a circle with a radius R around a point with certain coordinates or a block of buildings with a geographical address meeting a certain criteria). A map might also be described by a set of points forming a polygon or other geometrical shape. For example a map might be built by reportings of network performance degradation as sent by one or more wireless device 200. Each such reporting might then contain information indicating coordinates where the network performance degradation was experienced and what type of network performance degradation that was experienced. For example, the network node 300 might specify coordinates that identifies a geographical area of interest where radio testing is to be performed, or where network outage intentionally might be triggered, which might result in a network performance degradation being experienced by the terminal devices 100 inside the geographical area of interest.

Once the wireless devices 200 has obtained information identifying the network performance degradation area, the wireless devices 200 will commence reporting network performance degradation when being located inside the network performance degradation area.

In some aspects the wireless device 200 is informed in advance by the network node 300 of the type of network performance degradation for which the network node 300 requests reportings. Particularly, according to an embodiment, the wireless device 200 is configured to perform (optional) step S104:

S104: The wireless device 200 obtains, from the network node 300, information identifying a network performance degradation type. The network performance degradation is then reported only when the wireless device 200 is experiencing network performance degradation of the network performance degradation type.

According to a first example, the network performance degradation type pertains to a radio parameter to be reported when being above or below a certain threshold. For example, Reference Signal Received Quality (RSRQ) could be reported when being below −13, Reference Signal Received Power (RSRP) could be reported when being below −112 dBm, etc. The wireless devices 200 is then considered as entering a degradation area when one of these thresholds, e.g. RSRQ<−13, is verified. According to this example, as long as the wireless device has its RSRQ<−13 the wireless device 200 is considered to be in the degradation area and when its RSRQ>−13 the wireless devices 200 is considered as having left the degradation area.

According to a second example, the network performance degradation type pertains to what kind of latency is experienced by the wireless device 200. A reporting of network performance degradation could then be made when the experienced latency is above a threshold.

According to a third example, the network performance degradation type pertains to the wireless device 200 experiencing a temporary loss of network coverage.

According to a fourth example, the network performance degradation type pertains to any combination of the first, second, and third examples.

Once the wireless devices 200 has obtained information identifying the network performance degradation type, the wireless devices 200 will commence reporting the network performance degradation of the identified type.

There could be different examples of network performance degradation. According to some non-limiting examples, the network performance degradation pertains to at least one radio condition, such as signal quality or signal strength, as experienced by the wireless device 200, being below a threshold value. In general terms, by network performance degradation is meant any type of degradation impacting performance of the network, as detectable by the wireless device 200. When the network performance degradation is of type radio, then this might correspond not only to radio degradation experienced by the wireless device 200, such as radio link quality lower than a threshold or received signal strength below a threshold, a block error rate (BLER) being above a threshold, a dropped call, a round trip time (RTT) being higher than a threshold, a radio interface load being above a threshold, etc., but it could also corresponds to a situation when the wireless device 200 is handed over to a higher latency network or when the wireless devices 200 temporarily has been out of network coverage.

There could be different ways for the wireless device 200 to detect the network performance degradation. In some aspects, the network performance degradation is detected by means of one or more events. Particularly, according to an embodiment, the wireless device 200 is configured to perform (optional) step S106:

S106: The wireless device 200 detects occurrence of an event. The event pertains to the network performance degradation. The network performance degradation is then reported in response thereto. That is, according to this embodiment, the selecting in step S108 and the reporting in step S110 is then performed in response to the event having been detected in step S106.

There could be different ways for the wireless device 200 to report the network performance degradation to the network node 300.

In some aspects the network performance degradation is reported using radio resource control (RRC) signalling. In particular, according to an embodiment, the network performance degradation is by the wireless device 200 reported to the network node 300 in an RRC measurement report. When the wireless device 200 is in connected mode, the reporting could thus be made via a dedicated message, such as via an RRC measurement report message. When the wireless device 200 is in idle mode, the reporting could be made via a modified RRC call setup procedure.

According to a first example, the wireless device 200 sends one RRC measurement report for each logged occurrence of the network performance degradation. According to a second example, the wireless device 200 sends only two RRC measurement reports; a first report is sent upon the wireless device 200 detecting the beginning of the network performance degradation and a second report is sent upon the wireless device 200 detecting expiration, or cessation, of the network performance degradation.

The reporting might indicate if the network performance degradation was reported according to the first configuration or the second configuration. That is, according to an embodiment, the RRC measurement report comprises an indication of the selected configuration. Such an indication might be provided by means of a flag. For example, if the flag is set, then this is an indication that the reporting is made using the second configuration, and if the flag is not set, then this is an indication that the reporting is made using the first configuration (or vice versa, depending on type of flag used). The flag could thus also give an indication as to whether the wireless device 200 is moving slowly in the same small location/residency or it is moving at a considerable speed in a large area, since this is how the configuration is selected.

Further, the reporting might include also other types of information in addition to indicating that there is a network performance degradation. For example, the wireless device 200 might report time, location, type, and/or level of network performance degradation. That is, according to an example, each reporting of the network performance degradation is provided as a tuple, the tuple identifying time, location, and type and/or level of network performance degradation experienced by the wireless device 200. How much information to include in each reporting might depend on how often the reporting is to be performed, the bandwidth (or amount of radio resources) available for each reporting, etc.

Figure 3:
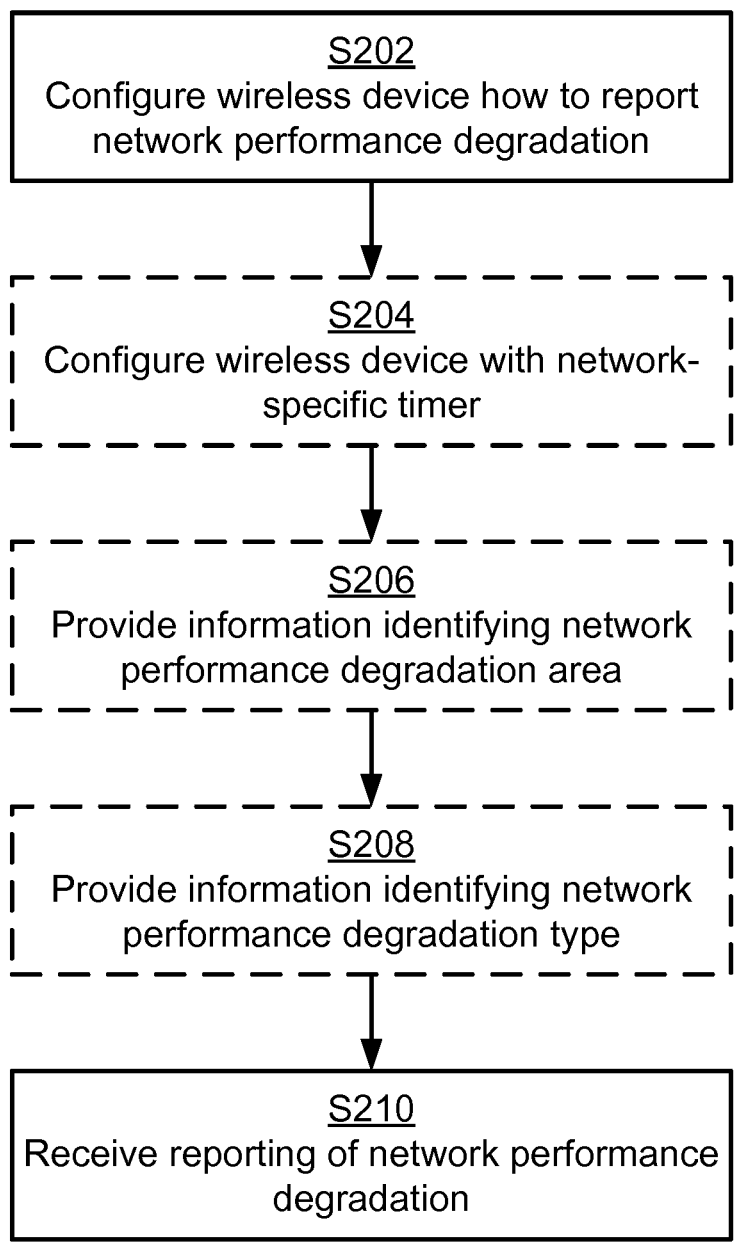

Reference is now made to FIG. 3 illustrating a method for handling reporting of network performance degradation from a wireless device 200 in a communications system 100 as performed by the network node 300 according to an embodiment.

S202: The network node 300 configures the wireless device 200 to report the network performance degradation according to a first configuration when current speed of travel of the wireless device 200 is above a speed threshold, and else to report the network performance degradation according to a second configuration. According to the second configuration the reporting is controlled by a network-specific timer. A new reporting of the network performance degradation for one and the same location is only allowed upon expiration of the network-specific timer.

As disclosed above, the wireless device 200 selects one of these configurations and reports the network performance degradation using the selected configuration. Thus, the network node 300 is configured to perform step S210:

S210: The network node 300 receives reporting of the network performance degradation as currently experienced by the wireless device 200 according to one of the configurations as selected by the wireless device 200.

Embodiments relating to further details of handling reporting of network performance degradation from a wireless device 200 in a communications system 100 as performed by the network node 300 will now be disclosed.

There may be different ways for the network node 300 to receive the reporting of the network performance degradation from the wireless device 200. As disclosed above, in some aspects the network performance degradation is reported using radio RRC signalling. That is, according to an embodiment, the reporting of the network performance degradation is by the network node 300 received in a RRC measurement report from the wireless device 200.

As further disclosed above, in some aspects reporting might indicate if the network performance degradation was reported according to the first configuration or the second configuration. That is, according to an embodiment, the RRC measurement report comprises an indication of the configuration selected by the wireless device 200 for the reporting.

As disclosed above, the wireless device 200 might, by the network node 300, be configured with the network-specific timer via broadcast transmission or radio resource control signalling. Particularly, according to an embodiment, the network node 300 is configured to perform (optional) step S204:

S204: The network node 300 configures the wireless device 200 with the network-specific timer via broadcast transmission or radio resource control signalling.

In some aspects the wireless device 200 is only configured with the network-specific timer when, according to the indication, the network performance degradation was reported according to the second configuration. That is, the wireless device 200 might only be configured with network reminder timer when the above-mentioned flag is set.

As disclosed above, the information identifying the network performance degradation area might either be explicit (such as in the form of a map) or be implicit. Particularly, according to an embodiment, the network node 300 is configured to perform (optional) step S206:

S206: The network node 300 provides, to the wireless device 200, information identifying a network performance degradation area. The network performance degradation is then to be reported only when the wireless device 200 is located within the network performance degradation area.

As disclosed above, in some aspects the wireless device 200 is informed in advance by the network node 300 of the type of network performance degradation for which the network node 300 requests reportings. Particularly, according to an embodiment, the network node 300 is configured to perform (optional) step S208:

S208: The network node 300 provides, to the wireless device 200, information identifying a network performance degradation type. The network performance degradation is then to be reported only when the wireless device 200 is experiencing network performance degradation of the network performance degradation type.

The network node 300, upon receiving reportings of the network performance degradation, might thus build a degradation map (that can be used to identify a network performance degradation area) based on reportings of the network performance degradation. The accuracy of the degradation map increases with increasing number of reportings of the network performance degradation from different wireless devices 200.

The network node 300 will analyze the received reportings of the network performance degradation and then take the appropriate action. For example, after receiving a certain number of reportings of the same network performance degradation, the network node might configure the wireless devices 200 with the second configuration, i.e., to perform reporting of the network performance degradation according to the network-specific timer.

There could be further actions that the network node 300 might take, for example logging one or more events of the network performance degradation, initiating a self-organizing network (SON) algorithm aimed to resolve the network performance degradation, issuing an alarm to make another network entity, or personnel, aware of the network performance degradation, issuing a notification (such as via a short message service (SMS) or another application) to subscribers of the wireless devices that the network is aware of the network performance degradation, etc. The exact type of action the network node 300 takes is out of the scope of the present disclosure.

Figure 4:
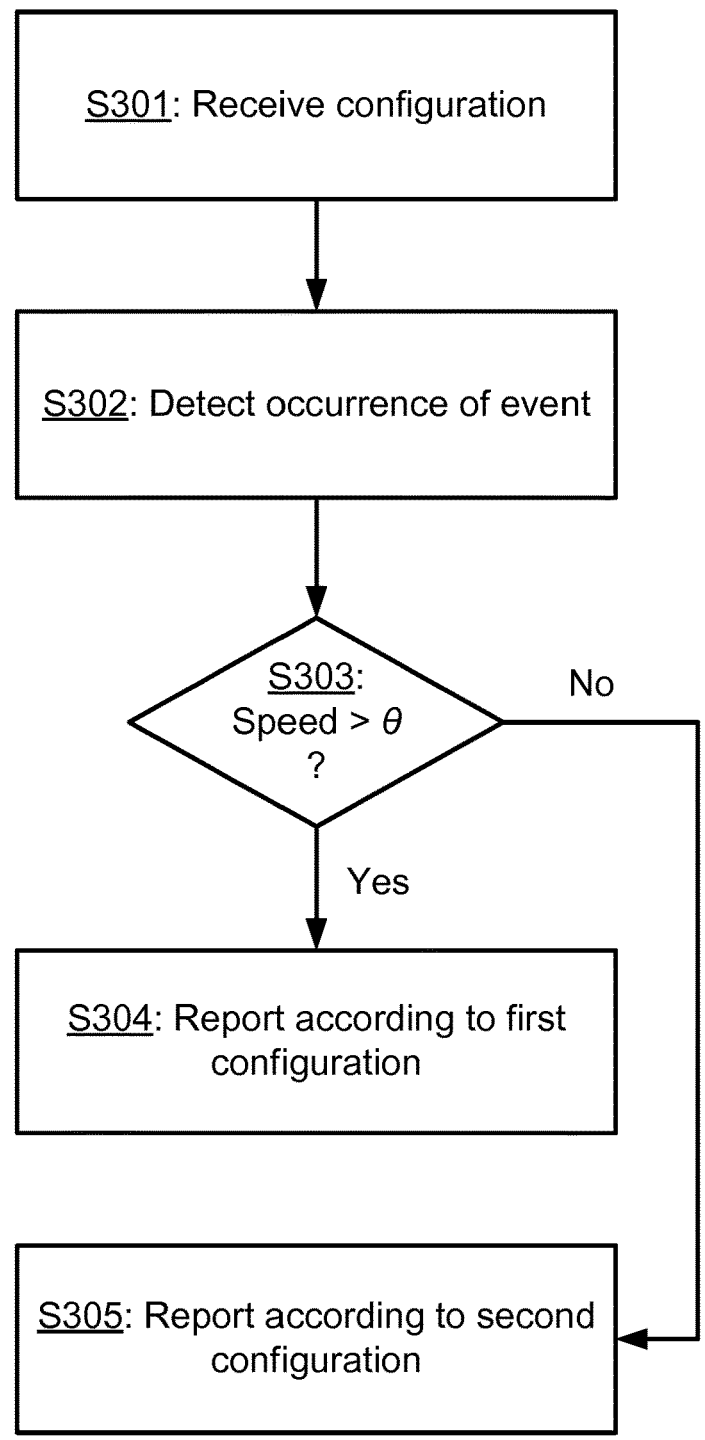

One particular embodiment for reporting network performance degradation in a communications system 100 based on at least some of the above disclosed embodiments will now be disclosed in detail with reference to the flowchart of FIG. 4.

S301: The wireless device 200 receives the first configuration and the second configuration from the network node 200.

S302: The wireless device 200 detects occurrence of an event. The event pertains to the network performance degradation. In some aspects the wireless devices logs the geographical location where the network performance degradation is experienced. In this respect the wireless device 200 might log its geographical location using any available means, such as using a geographical positioning system such as the global positioning system (GPS).

S303: The wireless device 200 decides according to which of the two configurations the reporting of the network performance degradation is to be made based on its current speed of travel. If the current speed of travel is higher than a threshold θ, step S304 is entered. Else step S305 is entered. In this respect the wireless device 200 might log its movement using any available means, such as an accelerometer provided in the wireless devices 200.

S304: The wireless device 200 reports the network performance degradation according to the first configuration. That is, as long as the speed of travel is above the threshold θ, the wireless devices 200 will report the network performance degradation according to the first configuration as disclosed above in more detail.

S305: The wireless device 200 reports the network performance degradation according to the second configuration. That is, as long as the speed of travel is not above the threshold θ, the wireless devices 200 will report the network performance degradation according to the second configuration. As disclosed above, the second configuration is based on the use of timers (a network-specific timer, and optionally a device-specific timer) as specified above. As disclosed above, the wireless device 200 might be configured with the network-specific timer via broadcast transmission or radio resource control signalling. As further disclosed above, the wireless device 200 could be preconfigured with the device-specific timer and/or the device-specific timer could be reconfigurable by the network operator of the wireless device 200.

According to the device-specific timer, If the wireless device 200 stays longer than a predefined period in the same network degradation area, and does not receive any feedback from the network node 300, the wireless device 200 might send a notification to the network 300 that the wireless device 200 has stayed long enough in the degradation area. The wireless device 200 might send such a notification periodically until the issue causing the network performance degradation has been solved or only once.

Figure 5:
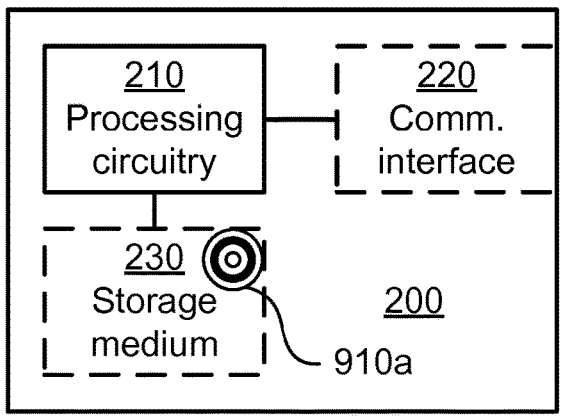
FIG. 5 is a schematic diagram showing functional units of a wireless device according to an embodiment.

FIG. 5 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with other entities, functions, nodes and devices of the communications system 100, such as at least the network node 300. As such the communications interface 220 may comprise one or more transmitters and receivers, comprising analogue and digital components.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 6:
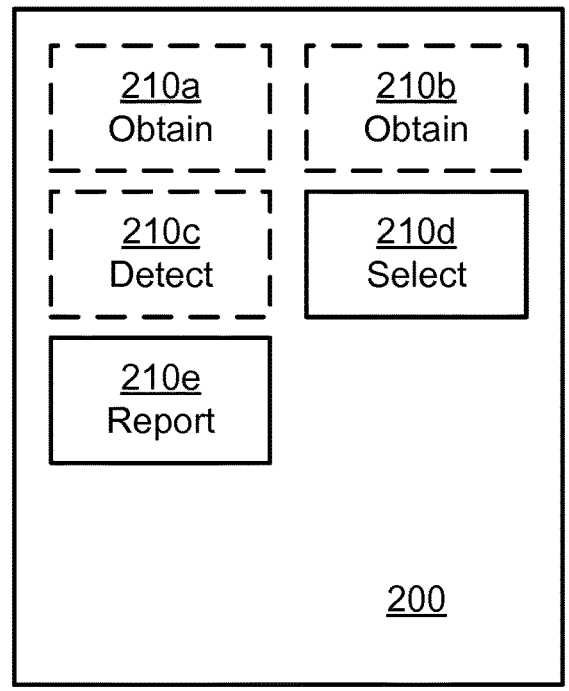
FIG. 6 is a schematic diagram showing functional modules of a wireless device according to an embodiment.

FIG. 6 schematically illustrates, in terms of a number of functional modules, the components of a wireless device 200 according to an embodiment. The wireless device 200 of FIG. 6 comprises a number of functional modules; a select module 210d configured to perform step S108, and a report module 210e configured to perform step S110. The wireless device 200 of FIG. 6 may further comprise a number of optional functional modules, such as any of an obtain module 210a configured to perform step S102, an obtain module 210b configured to perform step S104, and a detect module 210c configured to perform step S106. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the wireless device 200 as disclosed herein.

Examples of wireless devices 200 have been given above.

Figure 7:
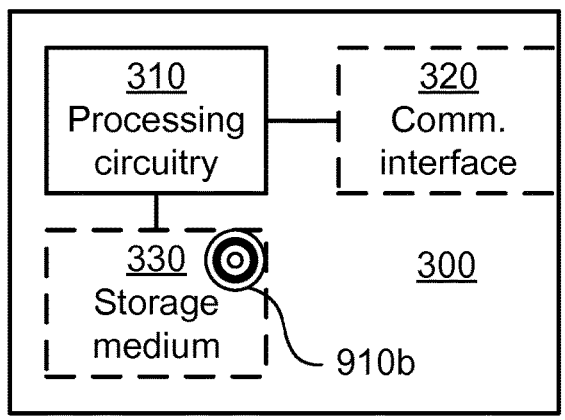
FIG. 7 is a schematic diagram showing functional units of a network node according to an embodiment.

FIG. 7 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, functions, nodes and devices of the communications system 100, such as at least the wireless device 200, the core network 120, and the radio access network node 140. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 8:
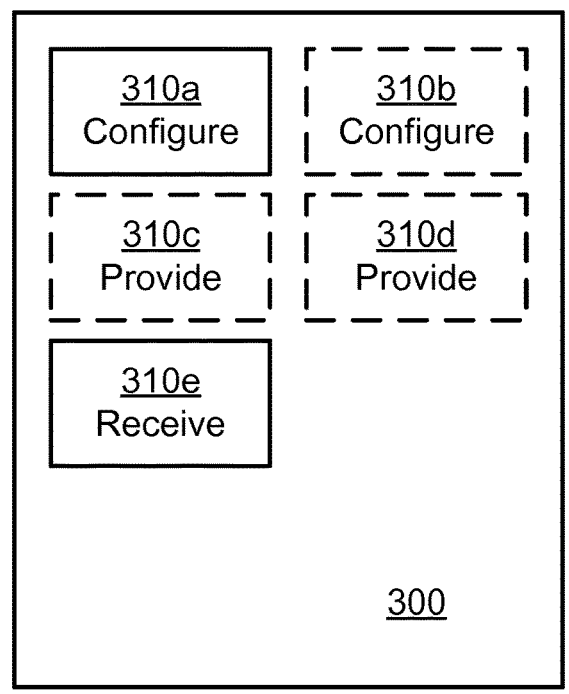
FIG. 8 is a schematic diagram showing functional modules of a network node according to an embodiment.

FIG. 8 schematically illustrates, in terms of a number of functional modules, the components of a network node 300 according to an embodiment. The network node 300 of FIG. 8 comprises a number of functional modules; a configure module 310a configured to perform step S202, and a receive module 310e configured to perform step S210. The network node 300 of FIG. 8 may further comprise a number of optional functional modules, such as any of a configure module 310b configured to perform step S204, a provide module 310c configured to perform step S206, and a provide module 310d configured to perform step S208. In general terms, each functional module 310a-310e may be implemented in hardware or in software. Preferably, one or more or all functional modules 310a-310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310e and to execute these instructions, thereby performing any steps of the network node 300 as disclosed herein.

Examples of network nodes 300 have been given above.

The network node 300 may be provided as a standalone device or as a part of at least one further device. For example, the network node 300 may be provided in a node of the radio access network 110 or in a node of the core network 120. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. In this respect, at least part of the network node 300 may reside in the radio access network, such as in the radio access network node, for cases when embodiments as disclosed herein are performed in real time.

Thus, a first portion of the instructions performed by the network node 300 may be executed in a first device, and a second portion of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 7 the processing circuitry 310 may be distributed among a plurality of devices, or nodes. The same applies to the functional modules 310a-310e of FIG. 8 and the computer program 920b of FIG. 9.

Figure 9:
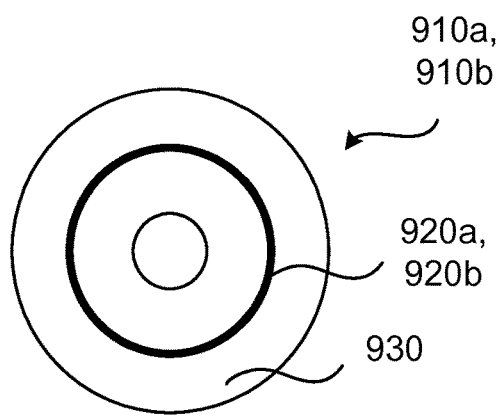
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the wireless device 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the network node 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for reporting network performance degradation in a communications system, the method being performed by a wireless device, the method comprising:
   selecting a first configuration for reporting the network performance degradation currently experienced when current speed of travel is above a speed threshold, and else selecting a second configuration, according to the second configuration the reporting being controlled by a network-specific timer, a new reporting of the network performance degradation only being allowed upon expiration of the network-specific timer;
   according to the second configuration, the reporting of the network performance degradation is controlled by a device-specific timer and, when the wireless device is configured with both the network-specific timer and the device-specific timer, a new reporting of the network performance degradation for a location is only allowed upon expiration of the network-specific timer, even when the device-specific timer expires first; and
   reporting, to a network node in the communications system, network performance degradation as experienced by the wireless device using the selected configuration.

2. The method according to claim 1, wherein the wireless device is, by the network node, configured with the network-specific timer via broadcast transmission or radio resource control signaling.

3. The method according to claim 1, wherein a new reporting of the network performance degradation for the location is only allowed when no feedback to other reporting for the location has been received and upon expiration of the device-specific timer.

4. The method according to a claim 1, wherein the device-specific timer has an expiration time that is reconfigurable by a network operator of the communications system.

5. The method according to claim 1, further comprising:
   obtaining, from the network node, information identifying a network performance degradation area, and wherein the network performance degradation is reported only when the wireless device is located within the network performance degradation area.

6. The method according to claim 1, further comprising:
   obtaining, from the network node, information identifying a network performance degradation type, and wherein the network performance degradation is reported only when the wireless device is experiencing network performance degradation of the network performance degradation type.

7. The method according to claim 1, wherein the network performance degradation is reported in a radio resource control measurement report.

8. The method according to claim 7, wherein the radio resource control measurement report comprises an indication of the selected configuration.

9. The method according to claim 1, wherein each reporting of the network performance degradation is provided as a tuple, the tuple identifying at least one of time, location, type and level of network performance degradation experienced by the wireless device.

10. The method according to claim 1, wherein the network performance degradation pertains to at least one radio condition, as experienced by the wireless device, being below a threshold value.

11. The method according to claim 1, further comprising:
   detecting occurrence of an event, wherein the event pertains to the network performance degradation, and wherein the network performance degradation is reported in response thereto.

12. A method for handling reporting of network performance degradation from a wireless device in a communications system, the method being performed by a network node in the communications system, the method comprising:

configuring the wireless device to report the network performance degradation currently experienced according to a first configuration when current speed of travel of the wireless device is above a speed threshold, and else to report the network performance degradation according to a second configuration, and according to the second configuration the reporting being controlled by a network-specific timer, a new reporting of the network performance degradation only being allowed upon expiration of the network-specific timer;

according to the second configuration, the reporting of the network performance degradation is controlled by a device-specific timer and, when the wireless device is configured with both the network-specific timer and the device-specific timer, a new reporting of the network performance degradation for a location is only allowed upon expiration of the network-specific timer, even when the device-specific timer expires first; and receiving reporting of the network performance degradation as currently experienced by the wireless device according to one of the configurations as selected by the wireless device.

13. The method according to claim 12, further comprising:

configuring the wireless device with the network-specific timer via one of broadcast transmission and radio resource control signaling.

14. The method according to claim 13, wherein the wireless device only is configured with the network-specific timer when, according to the indication, the network performance degradation was reported according to the second configuration.

15. The method according to claim 12, further comprising:

providing, to the wireless device, information identifying a network performance degradation area, and wherein the network performance degradation is to be reported only when the wireless device is located within the network performance degradation area.

16. The method according to claim 12, further comprising:

providing, to the wireless device, information identifying a network performance degradation type, and wherein the network performance degradation is to be reported only when the wireless device is experiencing network performance degradation of the network performance degradation type.

17. A wireless device for reporting network performance degradation in a communications system, the wireless device comprising processing circuitry, the processing circuitry being configured to cause the wireless device to:

select a first configuration for reporting the network performance degradation currently experienced when current speed of travel is above a speed threshold, and else selecting a second configuration, according to the second configuration the reporting being controlled by a network-specific timer, a new reporting of the network performance degradation only being allowed upon expiration of the network-specific timer;

according to the second configuration, the reporting of the network performance degradation is controlled by a device-specific timer and, when the wireless device is configured with both the network-specific timer and the device-specific timer, a new reporting of the network performance degradation for a location is only allowed upon expiration of the network-specific timer, even when the device-specific timer expires first; and report, to a network node in the communications system, network performance degradation as currently experienced by the wireless device using the selected configuration.

18. A network node for handling reporting of network performance degradation from a wireless device in a communications system, the network node comprising processing circuitry, the processing circuitry being configured to cause the network node to:

configure the wireless device to report the network performance degradation currently experienced according to a first configuration when current speed of travel of the wireless device is above a speed threshold, and else to report the network performance degradation according to a second configuration, and according to the second configuration the reporting being controlled by a network-specific timer, a new reporting of the network performance degradation only being allowed upon expiration of the network-specific timer;

according to the second configuration, the reporting of the network performance degradation is controlled by a device-specific timer and, when the wireless device is configured with both the network-specific timer and the device-specific timer, a new reporting of the network performance degradation for a location is only allowed upon expiration of the network-specific timer, even when the device-specific timer expires first; and receive reporting of the network performance degradation as currently experienced by the wireless device according to one of the configurations as selected by the wireless device.

* * * * *